(12) United States Patent
Hsiao et al.

(10) Patent No.: US 8,700,609 B2
(45) Date of Patent: Apr. 15, 2014

(54) ADVERTISING IN AN ONLINE COMMUNITY

(75) Inventors: Chung-Li Aliku Hsiao, Taipei (TW);
Yu-Lung Larry Kao, Taipei (TW)

(73) Assignee: Yahoo! Inc., Sunnyvale, CA (US)

( * ) Notice: Subject to any disclaimer, the term of this patent is extended or adjusted under 35 U.S.C. 154(b) by 813 days.

(21) Appl. No.: 12/195,332

(22) Filed: Aug. 20, 2008

(65) Prior Publication Data

US 2010/0049604 A1 Feb. 25, 2010

(51) Int. Cl.
*G06F 17/30* (2006.01)
*G06F 7/00* (2006.01)

(52) U.S. Cl.
USPC .......................................... 707/722; 707/738

(58) Field of Classification Search
CPC .......... G06Q 30/0601; G06Q 30/0251; G06Q 30/0277; H04M 1/0202; H04M 1/0264; H04M 1/72538; H04M 1/72544; H04M 1/72572; H04M 2250/10
USPC .......... 707/722, 732, 738, 608, 796; 705/300; 709/206
See application file for complete search history.

(56) References Cited

U.S. PATENT DOCUMENTS

| | | | | |
|---|---|---|---|---|
| 5,823,879 A * | 10/1998 | Goldberg et al. | ................ | 463/42 |
| 5,880,731 A * | 3/1999 | Liles et al. | ...................... | 715/758 |
| 6,301,609 B1 * | 10/2001 | Aravamudan et al. | ........ | 709/207 |
| 6,308,175 B1 * | 10/2001 | Lang et al. | ..................... | 707/608 |
| 6,487,583 B1 * | 11/2002 | Harvey et al. | .................. | 709/204 |
| 6,629,135 B1 * | 9/2003 | Ross et al. | ..................... | 709/218 |
| 6,651,053 B1 * | 11/2003 | Rothschild | ..................... | 707/770 |
| 6,745,178 B1 * | 6/2004 | Emens et al. | .................. | 707/741 |
| 6,785,671 B1 * | 8/2004 | Bailey et al. | ............... | 705/26.81 |
| 6,983,370 B2 * | 1/2006 | Eaton et al. | .................... | 713/182 |
| 6,993,572 B2 * | 1/2006 | Ross et al. | ..................... | 709/218 |
| 7,089,264 B1 * | 8/2006 | Guido et al. | ........... | 707/999.003 |
| 7,200,590 B2 * | 4/2007 | Everett-Church et al. | .... | 709/203 |
| 7,363,295 B2 * | 4/2008 | Szeto et al. | ..................... | 707/707 |
| 7,580,858 B2 * | 8/2009 | Almeida | ..................... | 705/14.39 |
| 7,665,107 B2 * | 2/2010 | Goodman et al. | ............... | 725/34 |
| 7,685,275 B2 * | 3/2010 | Pitkow et al. | .................. | 709/224 |
| 7,827,176 B2 * | 11/2010 | Korte et al. | .................... | 707/733 |
| 7,904,520 B2 * | 3/2011 | Neal et al. | ..................... | 709/206 |
| 2003/0191656 A1 * | 10/2003 | Staples | ............................. | 705/1 |
| 2004/0215731 A1 * | 10/2004 | Tzann-en Szeto | ............ | 709/207 |
| 2006/0026067 A1 * | 2/2006 | Nicholas et al. | ................ | 705/14 |
| 2007/0050822 A1 * | 3/2007 | Stevens et al. | ................... | 725/74 |
| 2007/0150537 A1 * | 6/2007 | Graham | ........................ | 709/203 |
| 2007/0157108 A1 * | 7/2007 | Bishop | .......................... | 715/771 |
| 2008/0140650 A1 * | 6/2008 | Stackpole | .......................... | 707/5 |
| 2008/0172344 A1 * | 7/2008 | Eager et al. | ..................... | 705/80 |
| 2008/0281709 A1 * | 11/2008 | Choi et al. | ........................ | 705/14 |
| 2009/0112685 A1 * | 4/2009 | Tunguz-Zawislak et al. | .. | 705/10 |
| 2009/0150233 A1 * | 6/2009 | Byrnes et al. | ................... | 705/14 |
| 2009/0259536 A1 * | 10/2009 | Yatskan et al. | .................. | 705/14 |

* cited by examiner

*Primary Examiner* — Pavan Mamillapalli
(74) *Attorney, Agent, or Firm* — Pillsbury Winthrop Shaw Pittman LLP

(57) ABSTRACT

An online advertising method which may allow advertisers to recruit a user of a websites to become an advertisement carrier, who may carry the advertiser's advertisements and display the advertisements to his fellow users in an online community. Since users in the advertisement carrier's online community have similar browsing interests, if an advertisement is related to the browsing interests of the online community, it may be better targeted at the users in the online community. The method may be used in, e.g., eCommerce, social networking and online photo albums.

21 Claims, 8 Drawing Sheets

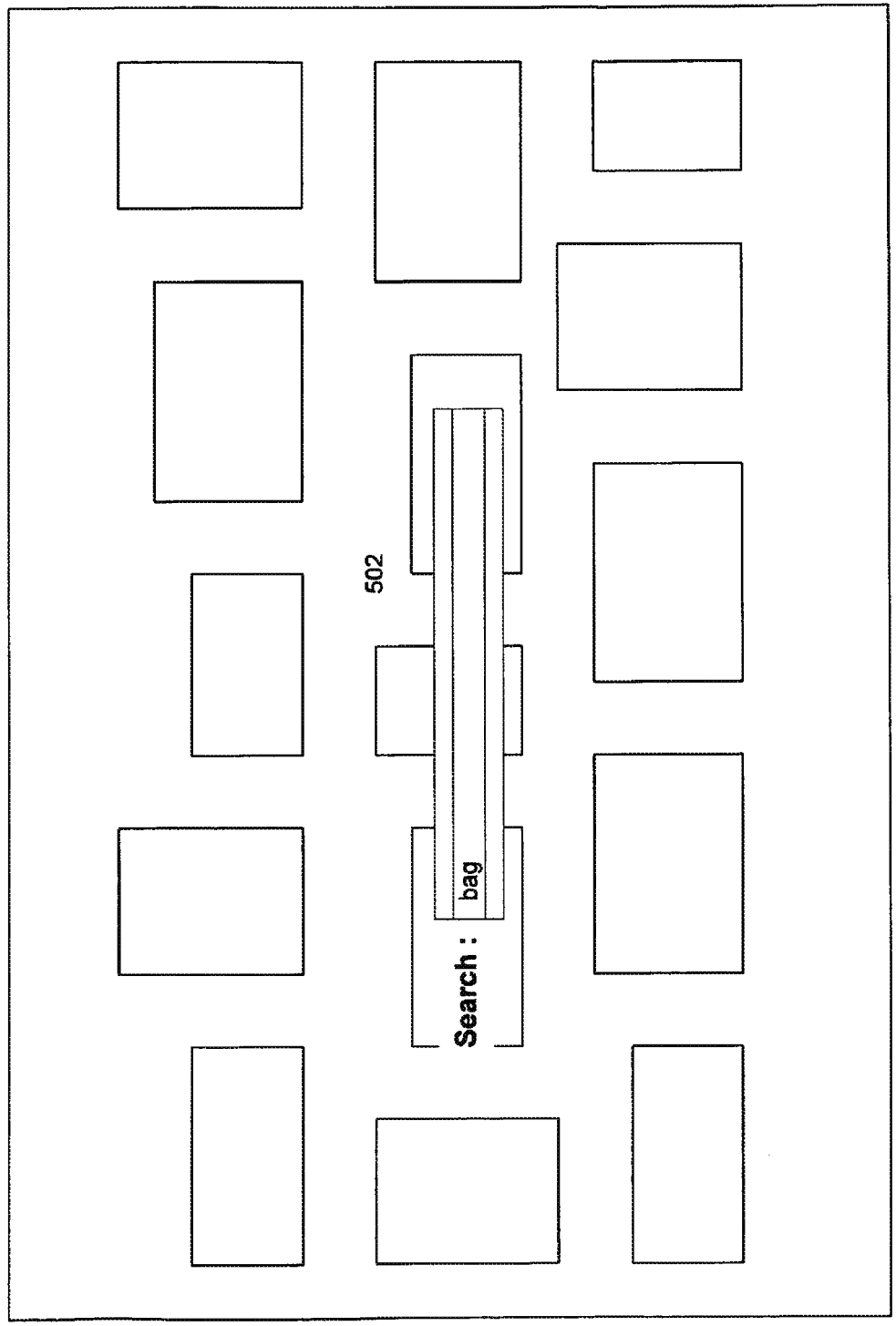

ADVERTISING IN AN ONLINE COMMUNITY

CROSS REFERENCE TO RELATED APPLICATION

The present application is related to the following U.S. Patent Application, which is assigned to the assignee hereof and incorporated herein by reference in its entirety: U.S. patent application Ser. No. 12/195,342, entitled Advertising in an Online Community, and filed concurrently herewith.

BACKGROUND

Field of the Invention

The present invention relates to online communities, and more particularly to advertising in an online community.

The Internet has become a major platform for exchanging goods and information, and has been used for, e.g., online shopping, online auction, photo album sharing and social networking. As a result, online advertising is becoming more and more important for advertisers (buyers of advertisement spaces, e.g., Nike™). Typically, an advertiser may pay a publisher websites (e.g., www.ebay.com or www.amazon.com) a certain amount of money for displaying its advertisement for a certain period of time, assuming that users of the publisher website may be interested in its advertisement.

However, such advertisements are static, and users may not look at the advertisements at all. In addition, although currently available systems allow advertisers to roughly analyze interests of users of a publisher website, and target its advertisements at users of the publisher website, the targeting usually is not precise enough.

BRIEF DESCRIPTION OF THE DRAWING FIGURES

Embodiments of the present invention are described herein with reference to the accompanying drawings, similar reference numbers being used to indicate functionally similar elements.

FIG. 5A-5D illustrate screenshots of a method for providing advertisements in an online community according to one embodiment of the present invention.

DETAILED DESCRIPTION

Internet users may form one or more online communities based on their common search interests. For example, users looking for a hotel in downtown New York on a travel website may form an online community "downtown New York hotels," and users looking for a bag on an auction website may form an online community "bag" or "purse". When a user A is searching for a bag on an auction website, user names or graphical representations of his fellow users in the online community "bag" may appear on the user A's screen, and the user A may click on the usernames or graphical representations to share information with one or more of his fellow users. The method for sharing information in an online community is described in the co-pending U.S. patent application Ser. No. 12/195,342, entitled Information Sharing in an Online Community, which is incorporated herein by reference in its entirety.

The present invention provides an online advertising method which may allow advertisers to recruit a user of a website to become an advertisement carrier, who may carry the advertiser's advertisements and display the advertisements to his fellow users in an online community. Since users in the advertisement carrier's online community have similar browsing interests, if an advertisement is related to the browsing interests of the online community, it may be better targeted at the users in the online community. The method may be used in, e.g., eCommerce, social networking and online photo albums. The invention may be carried out by computer-executable instructions, such as program modules stored in a memory device. Advantages of the present invention will become apparent from the following detailed description.

Figure 1:
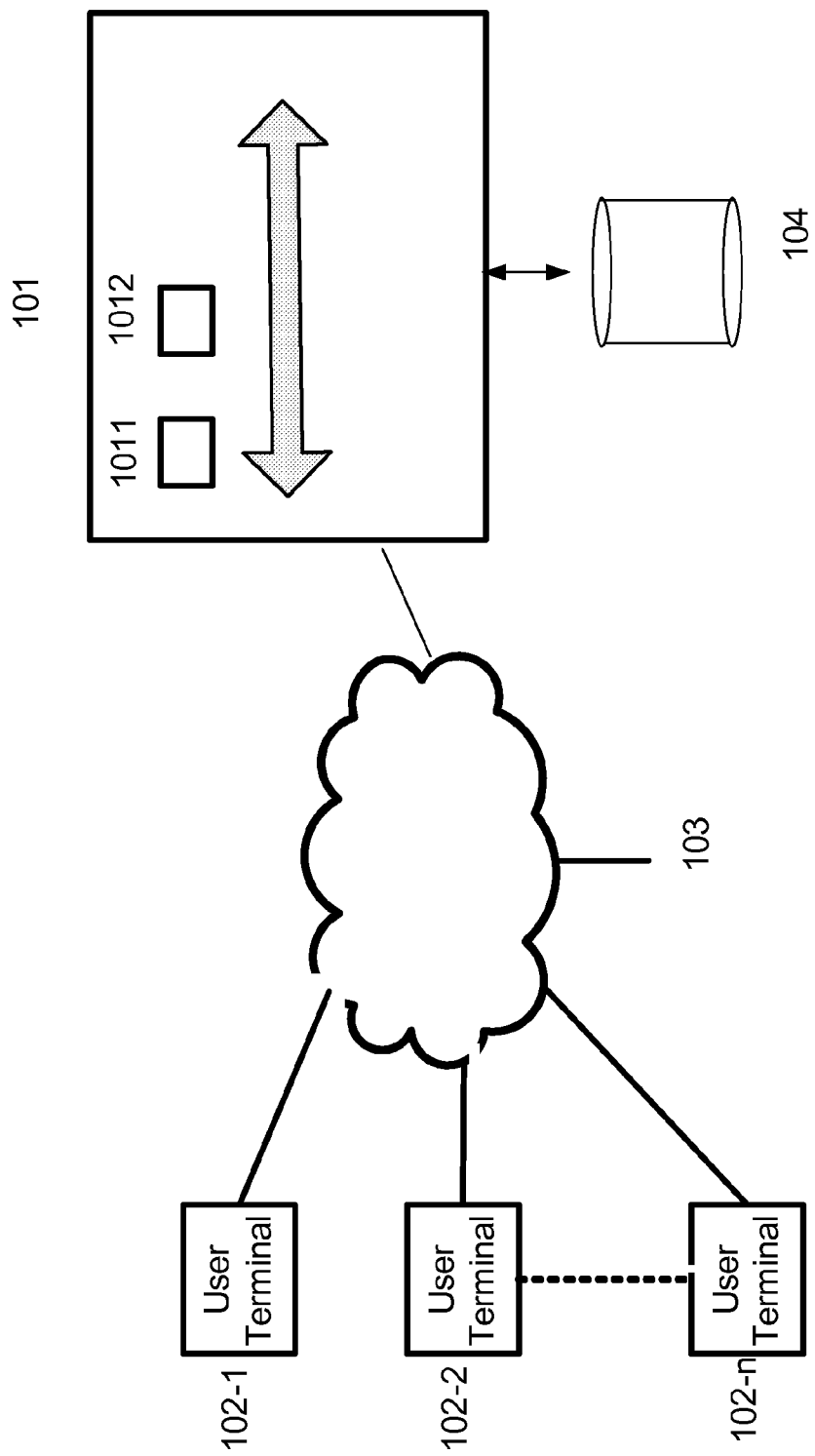
FIG. 1 illustrates a system for providing advertisements in an online community according to one embodiment of the present invention.

FIG. 1 illustrates a system for providing advertisements in an online community according to one embodiment of the present invention. As shown, an Internet server 101 may communicate over a network 103 with a number of user terminals 102-1, 102-2, . . . 102-N. The Internet server 101 may be a computer system and may control the operation of a website W, which may provide a certain type of service, e.g., online shopping, online auction, social networking or online photo albums. The Internet server 101 may include one or more of a screen, an input device, a processing unit 1011, memory devices 1012, and a system bus coupling various components in the computer system. An advertisement management module may be stored in one of the memory devices 1012 and control the processing unit 1011 to process advertising in an online community, including but not limited to the processes shown in FIGS. 2-4.

The Internet server 101 may access a database 104 which may store data relevant to the service provided by the website W, e.g., information about items to be sold, items to be auctioned, people in a social network or photos in online photo albums. The database 104 may also store information about users of the website W, e.g., user names, graphical representations, browsing histories, etc. The database 104 may further store advertisement information. The advertisement information may include an advertisement carrier's information, e.g., his user name, graphical representation, his agreement with an advertiser and result reports on advertisements he is carrying. The advertisement information may also include an advertiser's information, e.g., its name, address, its agreement with the website W, its advertisement carriers, and its agreements with the advertisement carriers. It should be understood that the advertisement information may be stored in a separate database.

The user terminals 102 may be personal computers, handheld or laptop devices, microprocessor-based systems, set top boxes, or programmable consumer electronics. Each user terminal may have a browser application configured to receive and display web pages, which may include text, graphics, multimedia, etc. The web pages may be based on, e.g., HyperText Markup Language (HTML) or extensible markup language (XML).

Network connectivity may be wired or wireless, using one or more communications protocols, as will be known to those of ordinary skill in the art.

Figure 2:
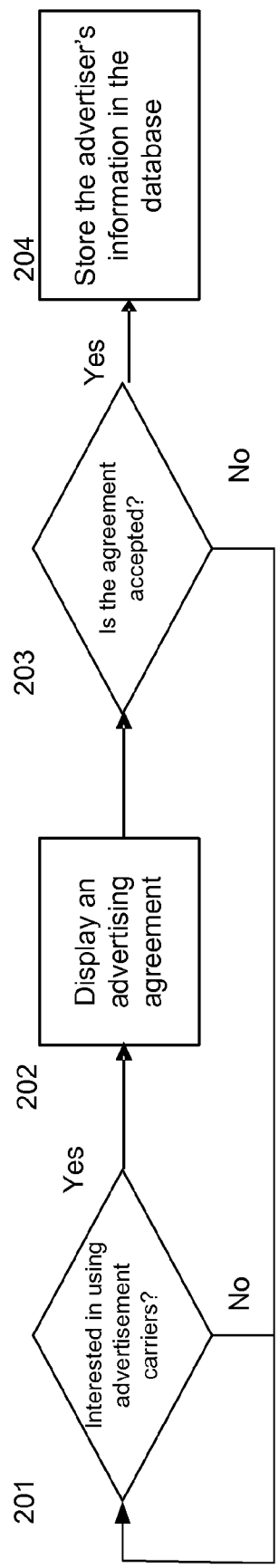
FIG. 2 illustrates a flowchart of a method for registering for online community advertising services according to one embodiment of the present invention.

FIG. 2 illustrates a flowchart of a method for registering for online community advertising services according to one embodiment of the present invention. The method may be used in the system shown in FIG. 1. An advertiser may, via a user terminal 102, register with the website W to get permissions to recruit and use the website W's users as advertisement carriers.

At 201, the website W may ask whether a store S, which sells Louis Vuitton™ bags, is interested in using advertisement carriers.

If yes, an advertising agreement may be displayed at 202. The agreement may be, e.g., that the website W will receive 2¢ each time the advertisement of the store S, which is displayed together with the user name or graphical representation of a user of the website W who has become an advertisement carrier of the store S, is clicked on.

If the store S is happy with the agreement, it may accept it at 203 and become an advertiser on the website W.

At 204, information about the store S (including, e.g., its name, address, type of goods or services), its advertisement and its agreement with the website W, may be stored in the database 104.

Figure 3:
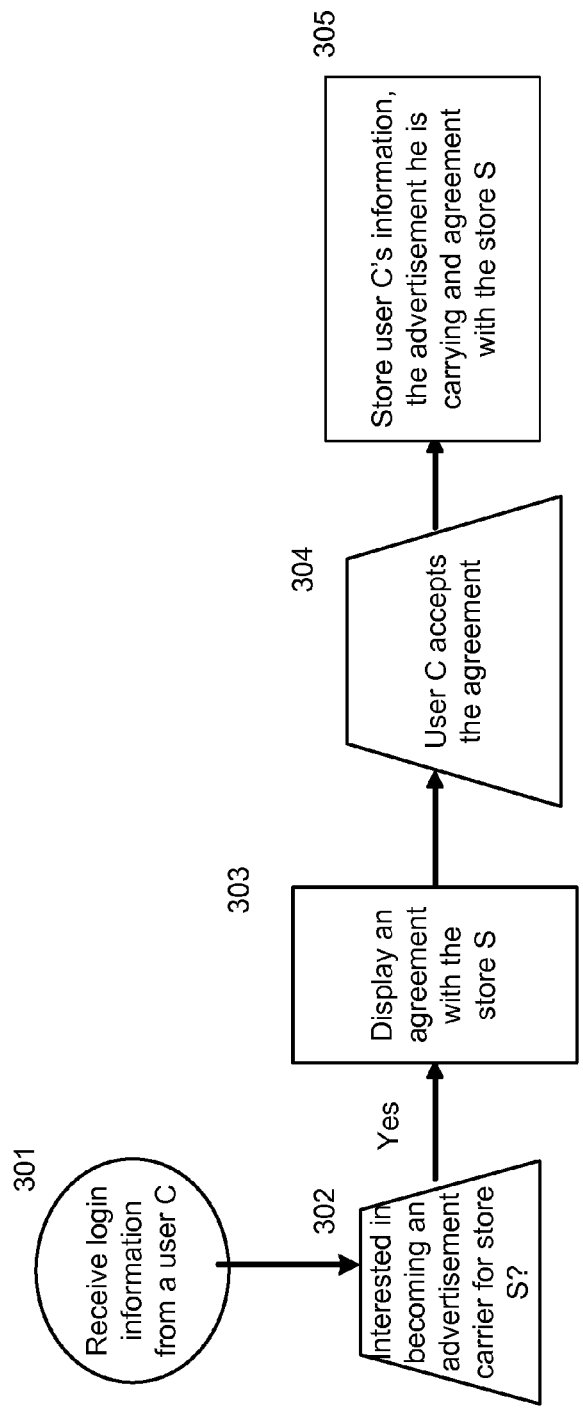
FIG. 3 illustrates a flowchart of a method for recruiting an advertisement carrier according to one embodiment of the present invention.

FIG. 3 illustrates a flowchart of a method for recruiting an advertisement carrier according to one embodiment of the present invention. The method may be used in the system shown in FIG. 1. An advertiser on the website W, e.g., the store S selling Louis Vuitton™ bags, may recruit users of the website W to become its advertisement carriers.

At 301, a user C may log into the website W and start to browse bags.

At 302, the store S may ask the user C whether he is interested in becoming an advertisement carrier, being paid for carrying the advertisement of the store S. The store S may display on a web page of the website W: "Do you want to be paid for carrying our advertisements?"

If the user C is interested in becoming an advertisement carrier, e.g., by answering yes to the question, an agreement with the store S may be displayed at 303. The agreement may be, e.g., the user C will receive 5¢ for each click on the link to the website of the store S which is displayed together with the user C's name or graphical representation.

If the user C is happy with the agreement, he may accept the agreement at 304 and become an advertisement carrier of the store S.

At 305, information about the user C, e.g., his user name, graphical representation, advertisers for which he has agreed to carry advertisements, and his agreement with the advertisers, may be stored in the database 104.

Figure 4:
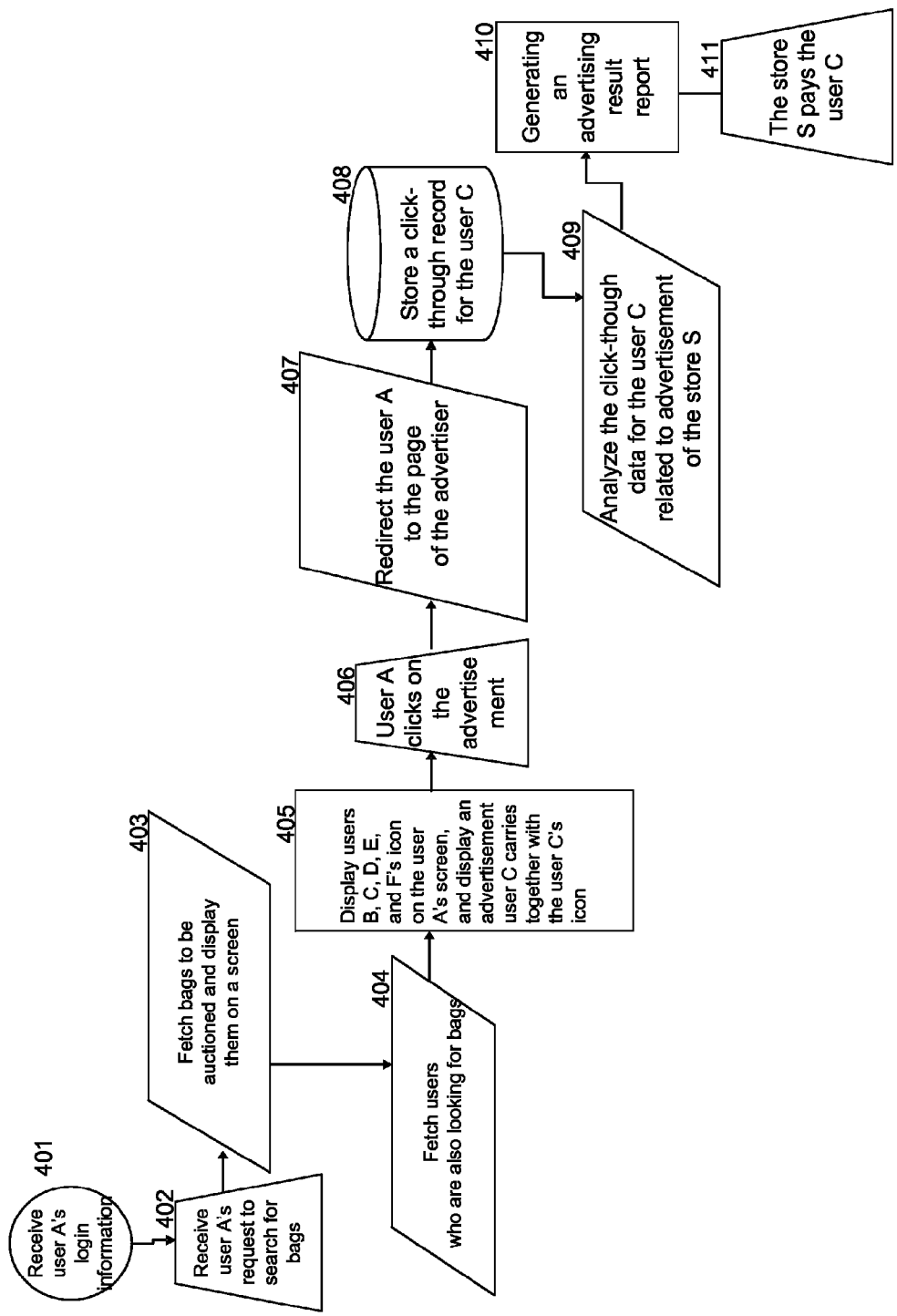
FIG. 4 illustrates a flowchart of a method for providing advertisements in an online community according to one embodiment of the present invention.

FIG. 4 illustrates a flowchart of a method for providing advertisements in an online community according to one embodiment of the present invention. The method of FIG. 4 may be used in the system shown in FIG. 1. A user A may have registered with the auction website W to use its services. During the registration, the user A may select his user name and graphic representation. Such information may be stored in the database 104.

Figure 5A:
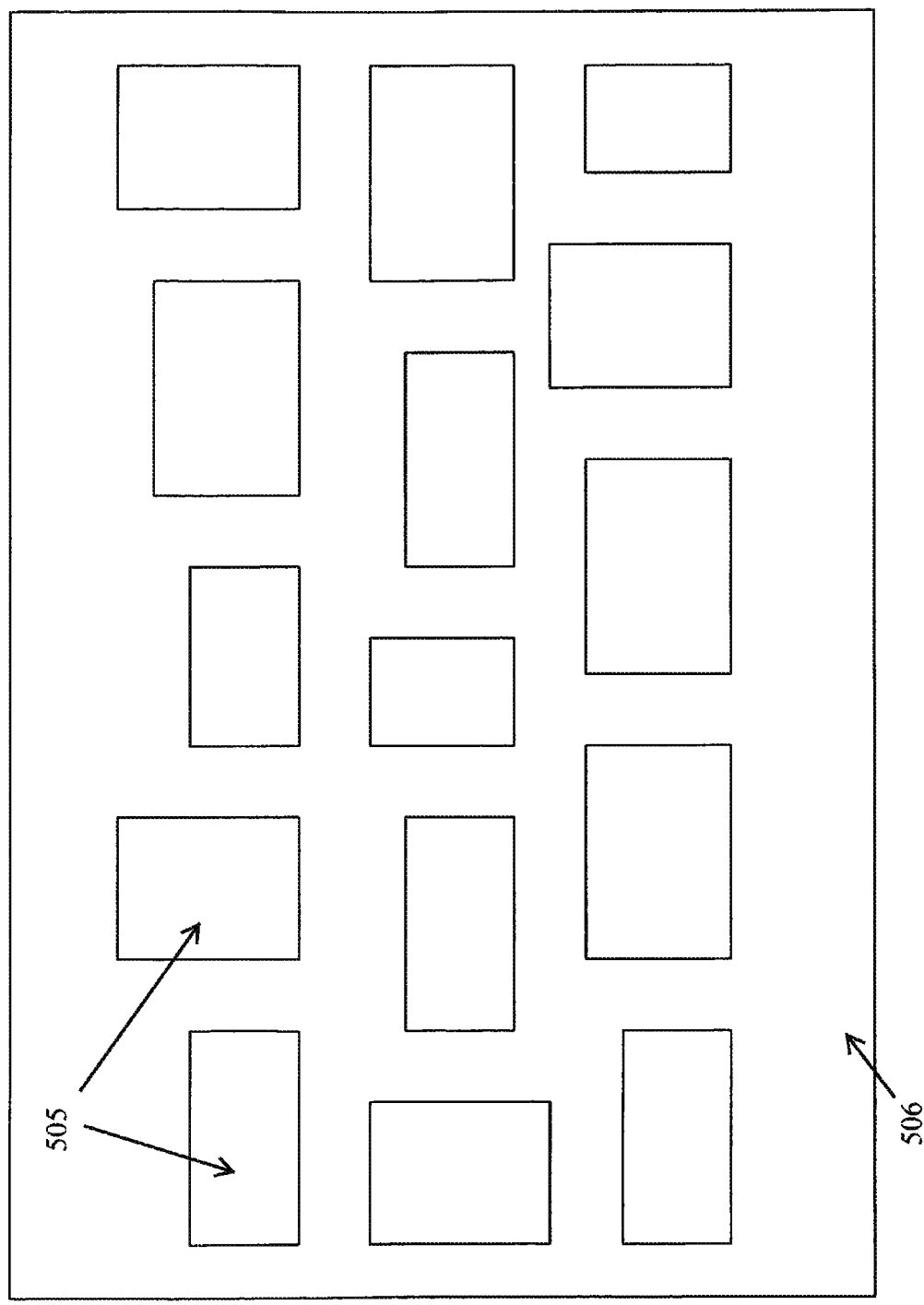

The user A may want to buy a bag, and may log into the auction website W at 401 and start browsing. Items 505 to be auctioned on the website W may be displayed on a web page 506, as shown in FIG. 5A.

Figure 5B:
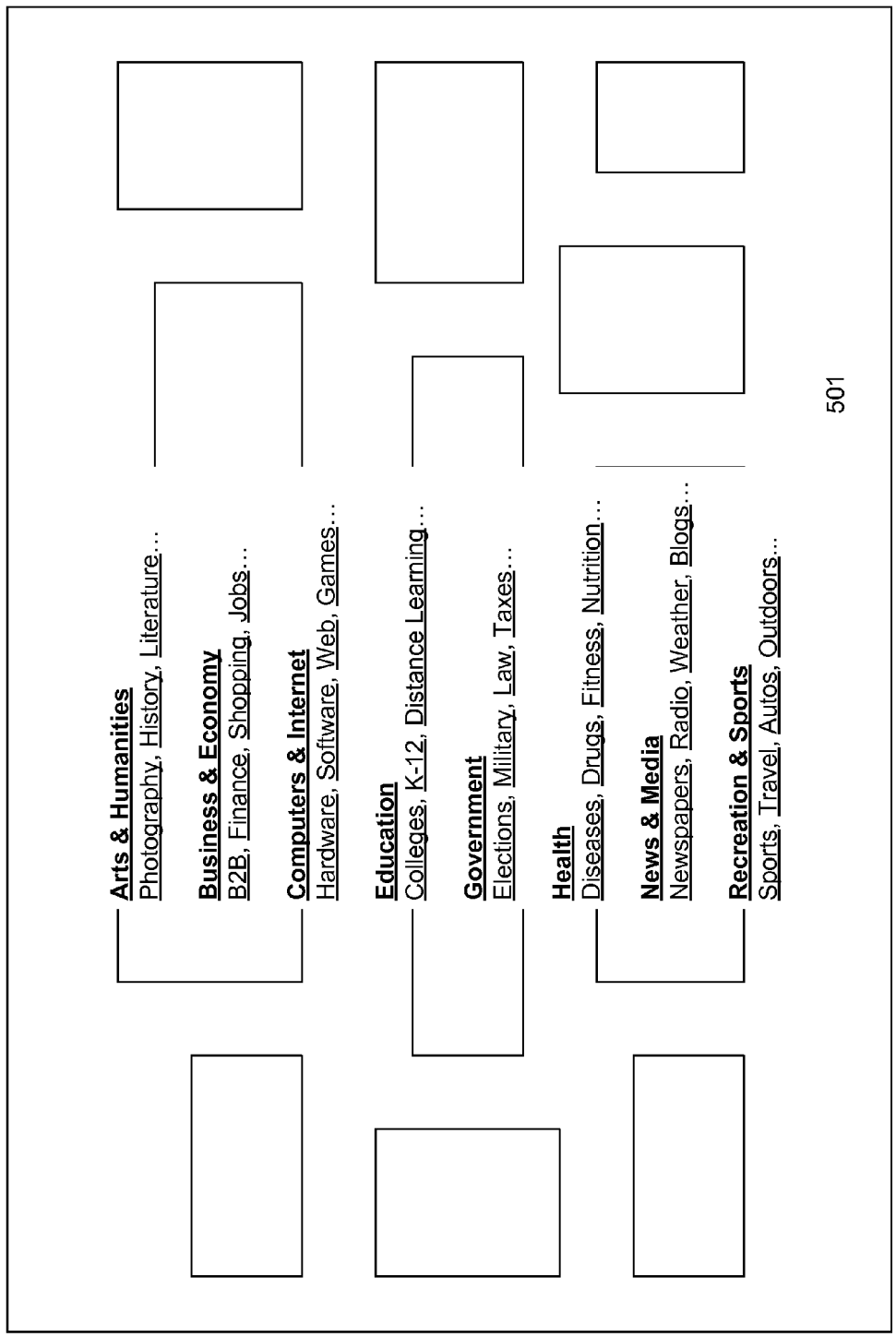

To get to the item he is interested in more quickly, at 402, the user A may press a button on the web page to display a category of items to be auctioned. A category 501 may be displayed on the web page the user A is looking at, as shown in FIG. 5B. The user A may navigate through the category to get to his target: the sub-category for bags.

Alternatively, the user A may press another button on the web page to display a search box. A search box 502 may be displayed on the web page the user A is looking at, as shown in FIG. 5C. The user A may type the word "bag" in the search box.

At 403, the server 101 may search the database 104, fetch bags to be auctioned, and display the fetched bags on a screen.

At 404, the server 101 may record in the database 104 that the user A is looking for bags, and access data in the database 104 to determine whether there are other users who are also looking for bags. The server 101 may determine that users B, C, D, E and F are looking for bags. The server 101 may fetch information about users B, C, D, E and F, e.g., their user names or graphical representations. It should be understood that search requests from users B, C, D, E and F do not need to be exactly the same as the search request from the user A, and only need to have some overlap with the search request from the user A. For example, the user D may be searching for LV speedy, and the user F may be looking for a tote bag. Since both LV speedy and tote belong to bags, the server 101 may determine that users D and F are looking for bags, and regard them as the user A's fellow users in the online community "bag."

Figure 5D:
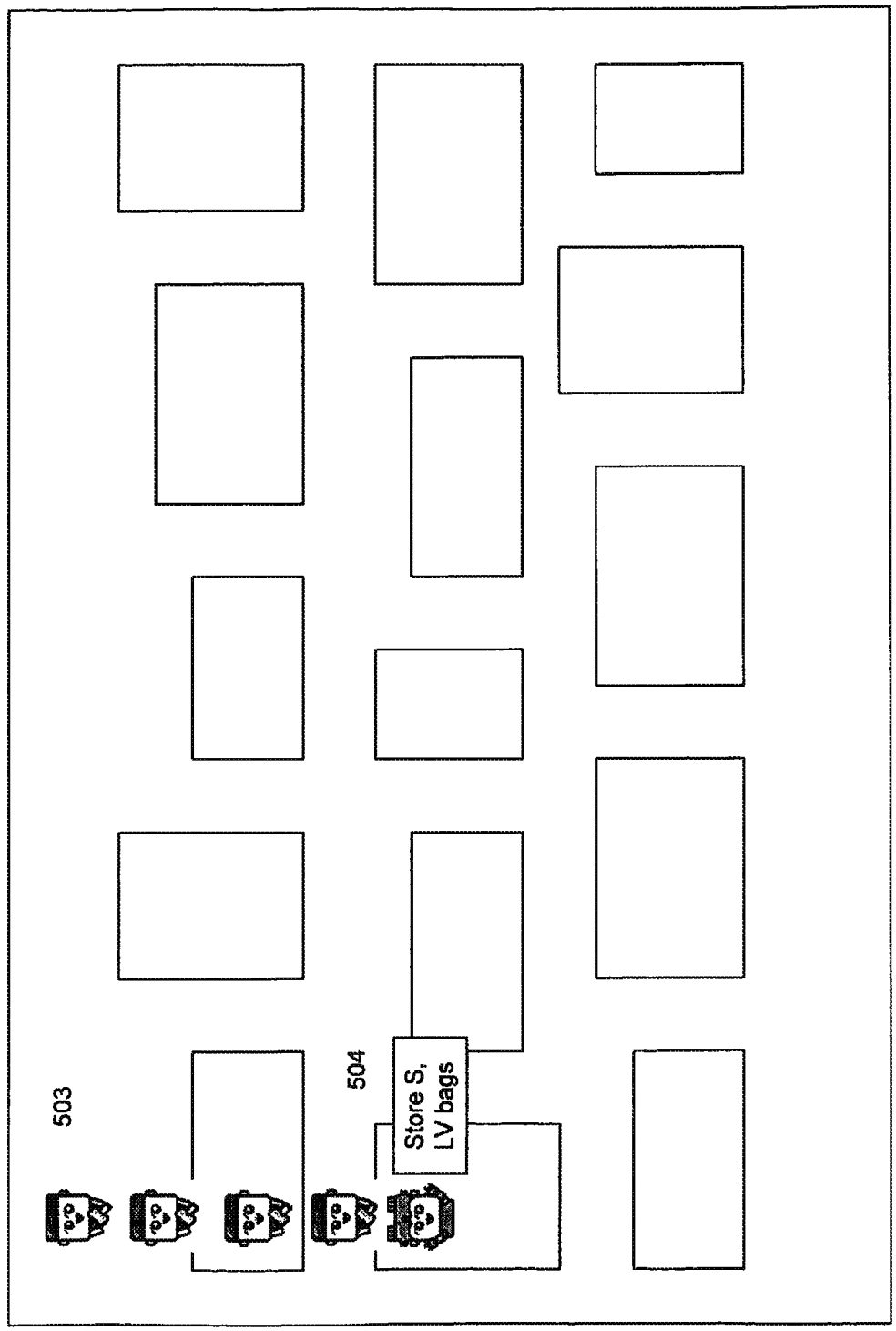

At 405, user names or graphical representations 503 of users B, C, D, E and F may be displayed on the screen that the user A is looking at, as shown in FIG. 5D. Since the user C is an advertisement carrier of the store S, an advertisement 504 of the store S may be displayed together with the graphical representation of the user C.

Meanwhile, the user name or graphical representation of the user A may be displayed on screens that the users B, C, D, E or F are looking at. If the user A is an advertisement carrier, the advertisement may appear together with his name or graphical representation.

If the user A clicks on the advertisement of the store S at 406, the server may redirect the user A to the webpage of the store S at 407.

At 408, the server 101 may write a record to the database 104, indicating that the advertisement of the store S carried by the user C has one click.

The server 101 may analyze click-though data of the user C at 409, and generate an advertising result report for the user C at 410. At 411, the store S may pay the user C according to the advertising result report. The store S may pay the user C per week or per month, according to their agreement. The server 101 may also generate an advertising result report for the store S, so that the owner of the website W may get money from the store S.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method for advertising in an online community which has at least two users, the method comprising:
   receiving a first search request to search a website from a first user;
   obtaining a list of search results matching the first search request;
   causing the list of search results to be displayed on a screen of the first user;

receiving a second search request to search the website from a second user;

in response to receiving the second search request, providing an inquiry from an advertiser to the second user that requests that a representation of the second user to be displayed with an advertisement of the advertiser on a screen of another user;

receiving an answer to the inquiry from the second user that indicates that the second user agrees that the representation of the second user can be displayed with the advertisement of the advertiser;

determining that the second user searches the website with a third search request having a scope that at least partly overlaps with a scope of the first search request; and causing the representation of the second user and the advertisement of the advertiser to be displayed on the screen of the first user in response to determining that the second user searches the website with the third search request.

2. The method of claim 1, wherein the representation is a graphical representation.

3. The method of claim 1, further comprising:
determining whether the first user clicks on the advertisement.

4. The method of claim 1, further comprising:
redirecting the first user to a website of the advertiser when the first user clicks on the advertisement.

5. The method of claim 1, further comprising:
storing a record indicating that the advertisement is clicked on.

6. The method of claim 5, further comprising:
analyzing, click-through data for the second user.

7. The method of claim 6, further comprising:
generating an advertising result report for the second user based on the click-through data.

8. The method of claim 7, further comprising:
causing a representation of the first user and an advertisement that the first user agrees to be displayed with the representation of the first user on a screen of the second user.

9. The method of claim 1, further comprising:
storing terms of an agreement between the website and the advertiser.

10. The method of claim 1, further comprising:
storing terms of an agreement between the second user and the advertiser.

11. The method of claim 1, wherein the first search request is made by the first user by selecting a category of items of interests.

12. A system for advertising in an online community which has at least two users, the method comprising:
a computer system which runs a website and is coupled to a computer network; and
a database,
wherein the computer system:
receives a first search request to search the website from a first user;
obtains a list of search results matching the first search request;
causes the list of search results to be displayed on a screen of the first user;
receives a second search request to search the website from a second user;
in response to receiving the second search request, provides an inquiry from an advertiser to the second user that requests that a representation of the second user to be displayed with an advertisement of the advertiser on a screen of another user;

receives an answer to the inquiry from the second user that indicates that the second user agrees that the representation of the second user can be displayed with the advertisement of the advertiser;

determines that the second user searches the website with a third search request having a scope that at least partly overlaps with a scope of the first search request; and causes the representation of the second user and the advertisement of the advertiser to be displayed on the screen of the first user in response to determining that the second user searches the website with the third search request.

13. The system of claim 12, wherein the representation is a graphical representation.

14. The system of claim 12, wherein the computer system further:
determines whether the first user clicks on the advertisement.

15. The system of claim 12, wherein the computer system further:
redirects the first user to a website of the advertiser when the first user clicks on the advertisement.

16. The system of claim 12, wherein the computer system further:
stores a record indicating that the advertisement is clicked on.

17. The system of claim 16, wherein the computer system further:
analyzes click-through data for the second user.

18. The system of claim 17, wherein the computer system further:
generates an advertising result report for the second user based on the click-through data.

19. The system of claim 12, wherein the database stores terms of an agreement between the website and an advertiser.

20. The system of claim 12, wherein the database stores terms of an agreement between the second user and the advertiser.

21. A computer program product comprising a computer-readable device having instructions which, when performed by a computer, perform a method for advertising in an online community which has at least two users, the method comprising:
receiving, a first search request to search a website from a first user;
obtaining a list of search results matching the first search request;
causing the list of search results to be displayed on a screen of the first user;
receiving a second search request to search the website from a second user;
in response to receiving the second search request, providing an inquiry from an advertiser to the second user that requests that a representation of the second user to be displayed with an advertisement of the advertiser on a screen of another user;
receiving an answer to the inquiry from the second user that indicates that the second user agrees that the representation of the second user can be displayed with the advertisement of the advertiser;
determining that the second user searches the website with a third search request having a scope that at least partly overlaps with a scope of the first search request; and causing the representation of the second user and the advertisement of the advertiser to be displayed on the screen of the first user in response to determining that the second user searches the website with the third search request.

\* \* \* \* \*